UNITED STATES PATENT OFFICE.

CHARLES J. BINMORE, OF MONTREAL, QUEBEC, CANADA.

CULTIVATING IMPLEMENT.

1,419,953.

Specification of Letters Patent. Patented June 20, 1922.

Application filed April 19, 1921. Serial No. 462,601.

*To all whom it may concern:*

Be it known that I, CHARLES J. BINMORE, a subject of the King of Great Britain, and resident of the city of Montreal, in the Province of Quebec and Dominion of Canada, have invented certain new and useful Improvements in Cultivating Implements, of which the following is a full, clear, and exact description.

This invention relates broadly to improvements in agricultural implements and more particularly to an implement combining the functions of a plow and a harrow, and adapted to turn over and break up ground in a very thorough manner.

The invention resides broadly in providing a wheeled vehicle preferably carrying a source of power connected to drive any suitable number of adjustable shafts each carrying a plurality of ground breaking tools. Means are provided for regulating the depth to which the implements may penetrate.

In the drawings which illustrate the invention:—

Fig. 1 is a side elevation of the apparatus.

Fig. 2 is a plan view.

Fig. 3 is a longitudinal elevation partly in section.

Referring more particularly to the drawings, 11 designates a vehicle frame of any suitable construction mounted on running wheels 12 and carrying a source of power such as a gasolene motor 13 preferably concealed under a hood 14. At the front end of the motor is a gear case 13ª containing a train of gears adapted to connect a plurality of shafts 15 with the motor. These shafts are preferably arranged in parallelism with one another and with the line of travel of the vehicle. While only two shafts are shown it will be understood that their number may be increased as desired. A universal joint 16 is provided in each shaft to permit the forward end thereof to be raised or lowered as desired. The shafts are journalled near their forward ends in bearings 17 which are preferably connected by any suitable means 18 in order to steady the bearings and shafts therein. Vertical adjustment of the shafts is obtained by means of a lever and quadrant mechanism 19 connected by a link 20 to the cross brace 18. The frame is provided with a forwardly extending portion or pole 21, to the lower side of which is attached a bracket 22 carrying a caster wheel 23, the wheel being disposed a short distance in front of the ends of the shafts 15. Whiffletrees 24 may be connected to the pole for animal draft or the pole may be used to connect the device to a tractor. A seat 25 is provided, at a convenient point, for an operator.

The forward extremities of the shafts 15 may be armed with any suitable type of tools. The tool illustrated in Figure 1 is in the form of one or more blades disposed in a gradual helix around the shaft after the manner of the knives of a lawn-mower. These knives 26 are preferably disposed, roughly speaking, in a frusto-conical arrangement as illustrated. Other forms of tools may be used, for example, the one illustrated in Figure 3 and comprising a central hub carrying a plurality of radiating fingers 27.

The operation of the device is extremely simple. The implement is drawn over the ground by any suitable means. The engine 13 being in operation, the tools are rotated at high angular speed so as to cut or tear up the soil with which they come in contact. Owing to the driving force being preferably separate from the traction force and to the fact that the shafts 15 rotate at comparatively high speed, the tools will in effect eat their way through the soil and so offer little or no resistance to the advance of the machine. By operating the mechanism 19 the inclination of the shafts 15 and consequently the depth of penetration into the soil may be regulated. Owing to the angular disposition of the shafts there is a tendency for them to burrow constantly deeper, thus imposing a draught on the pole 21. As this would throw considerable load on the necks of animals in the case of animal transport, the wheel 23 is provided immediately in front of the tools to keep the tools running at uniform depth in the soil. The rapidly revolving tools will break up and turn over the toughest sod or the hardest baked soil and bring it to such condition that it may be successfully cultivated.

It will be obvious that the motor may be replaced by a mechanical drive from the running wheels but in the case of a machine having a considerable number of tools this arrangement would require much more tractive force than could be supplied by a team of horses and such an arrangement is therefore limited to tractor-drawn or automotive apparatus, unless the number of tools is very limited or the cut very shallow.

Having thus described my invention, what I claim is:—

A device of the class described, comprising a wheeled framework, a source of power thereon, a plurality of flexible shafts driven from said source of power, a supplementary frame connecting and forming a support for the shafts and a single lever having link connection with said supplementary frame and operable to regulate the inclination of said shafts, and cutters carried by said shafts.

In witness whereof, I have hereunto set my hand.

CHARLES J. BINMORE.